| United States Patent [19] | [11] Patent Number: 4,956,166 |
|---|---|
| Verduijn | [45] Date of Patent: Sep. 11, 1990 |

[54] ZEOLITE L SYNTHESIS

[75] Inventor: Johannes P. Verduijn, Spijenisse, Netherlands

[73] Assignee: Exxon Chemical Patents, Inc., Linden, N.J.

[21] Appl. No.: 184,546

[22] Filed: Apr. 20, 1988

[30]  Foreign Application Priority Data

Apr. 22, 1987 [GB] United Kingdom ................ 8709506

[51] Int. Cl.$^5$ ............................................. C01B 33/28
[52] U.S. Cl. .................................................. 423/328
[58] Field of Search ............... 423/326, 328, 329, 330; 502/60, 77

[56]  References Cited

U.S. PATENT DOCUMENTS

| 3,216,789 | 11/1965 | Breck et al. | 423/328 |
| 3,867,512 | 2/1975 | Young | 423/328 |
| 4,530,824 | 7/1985 | Arika et al. | 423/329 |
| 4,544,539 | 10/1985 | Wortel | 423/328 |
| 4,554,146 | 11/1985 | Vaughan | 423/329 |

FOREIGN PATENT DOCUMENTS 0909264 10/1962 United Kingdom ................ 423/328

*Primary Examiner*—Robert L. Stoll
*Assistant Examiner*—R. Bruce Breneman
*Attorney, Agent, or Firm*—E. F. Sherer

[57]  ABSTRACT

Zeolite L is prepared in a synthesis modified by the addition of small amounts of copper, which suppresses unwanted zeolite W formation.

11 Claims, No Drawings

ZEOLITE L SYNTHESIS

This invention relates to a highly crystalline zeolite L, its preparation and use in catalysis, particularly for aromatization. In particular, it relates to zeolite L with cylindrical morphology, which provides a catalyst base giving extended lifetimes in the dehydrocyclization of alkanes.

Zeolite L has been known for some time and its use as a catalyst base in aromatization reactions is also described in the literature.

GB-A-2116450 describes a zeolite catalyst comprising a zeolite of the L family, at least one Group VIII metal and an alkaline earth metal selected from barium, strontium and calcium. The catalyst is used for reforming, dehydrocyclizing acyclic hydrocarbons, dehydroisomerizing alkylcyclopentanes and dealkylating toluene. Processes using such catalyst are described in GB-A-2114150 and GB-A-2142648. EP-A-0219354 describes an improved zeolite L having a characteristic morphology and/or size and/or cation content and/or silica/alumina ratio which is particularly valuable for use as a catalyst base in hydrocarbon conversions such as aromatization. This is prepared by introducing small amounts of magnesium, calcium, barium manganese, chromium, cobalt, nickel or zinc into the synthesis gel for zeolite L.

It has now been found that the incorporation of copper into the synthesis gel enables zeolite L to be made at low alkalinities and under conditions which normally favour formation of other zeolite species. Furthermore small crystallites may be obtained with a particular shape which has shown advantages in catalyst performance.

The invention provides a process for the preparation of zeolite L in which an alkaline reaction mixture comprising water, a source of aluminium and a source of copper, with a composition falling within the following molar ratios (expressed as oxides):

| | |
|---|---|
| $M_2^1O + CuO)/SiO_2$ | 0.18–0.36 |
| $H_2O/(M_2^1O + CuO)$ | 25–90 |
| $SiO_2/Al_2O_3$ | 5–15 |
| $M_2^1O(M_2^1O + CuO)$ | 0.9–0.9999 |

(wherein $M^1$ is an alkali metal) is heated to a temperature of from at least 750° C. and preferably from 100° C. to 250° C., more preferably from 120° C. to 225° C., to form the zeolite L of the invention.

There are five principal components to the reaction mixture or synthesis gel and thus generally:
aluminium
silicon
alkali metal, preferably potassium
copper
water
and the relative proportions of these components and the chosen reaction conditions are important if the desired zeolite L of the invention is to be obtained.

Zeolite W tends to be formed as a contaminant in zeolite L preparation at some extremes of gel composition. It is advantageous for the zeolite W content of the product to be minimized. The zeolite W content of the product can be monitored by its x-ray diffraction pattern.

Thus, in another aspect this invention provides process for the preparation of zeolite L, in which a reaction mixture comprising water, a source of alkali metal, a source of silicon, a source of aluminium and a source of copper is heated to a temperature of at least 75° C. to form the desired zeolite L, the reaction mixture being such that in the absence of the formed product would comprise substantial amounts of zeolite W, in which the presence of copper results in reduced contamination by zeolite W. It is surprisingly found that very small amounts (even in some systems as low as a few parts per million) of copper are effective at suppressing zeolite W, though the zeolite W level in the product depends upon other components of the reaction mixture.

In a further aspect, this invention provides a method of suppressing zeolite W formation in the preparation of zeolite L from a crystallisation gel in which the gel composition and/or crystallisation conditions such as stirring would otherwise allow zeolite W formation, which method comprises introducing into the gel a zeolite W-suppressing amount of a source of copper. The zeolite W-suppressing amount is as indicated above surprisingly small, and since copper also tends to result in smaller crystallite size in the product, it will not be desirable to increase the amount of copper beyond the level at which zeolite W is suppressed if smaller crystallites are not wanted. It has been found that the best results are obtained at extremely low, but non-zero, amounts of copper.

The alkali metal $M^1$ is very preferably potassium (K), but may be a mixture of potassium with other alkali metals, for example, sodium. It is a further surprising feature of the invention that a greater degree of replacement of potassium by other alkali metals is possible in the presence of the additional metal without significant amounts of zeolite W being formed in the zeolite L product. EP-A-0096479 indicates that the preferred maximum amount of alkali metal other than potassium is 30 mole % of the total alkali metal content. We have found that at this level of other alkali metal and even at greater levels the tendency to form zeolite W may be substantially completely suppressed by the presence of copper.

Thus, the preferred zeolites of the invention may be obtained within the following preferred ranges:

| | |
|---|---|
| $M_2^1O + CuO)SiO_2$ | 0.18–0.26 |
| $H_2O/(M_2^1O + CuO)$ | 50–90 |
| $SiO_2/Al_2O_3$ | 6–12 |
| $M_2^1O/(M_2^1O + CuO)$ | 0.959–0.9999 | where $M^1$ is potassium or a mixture of potassium and a second alkali metal $M^2$ and $K_2O/(K_2O+M^2O)=0.5-1$. The amount of copper may be very low, only a few ppm of the reaction mixture, and yet still have an effect in promoting zeolite L formation, forming smaller and/or more cylindrical zeolite L particles and/or promoting the properties of the zeolite L particles and/or promoting the properties of the zeolite L product. Thus in a further aspect this invention provides a process of preparing zeolite L in which there is added to the synthesis gel prior to crystallization a source of copper, in an amount such that the amount of copper in the gel is from 0.1 ppm to 0.1 wt. % of the gel, preferably from 5 ppm to 0.05 wt. % of the gel.

Copper may be introduced as any convenient compound such as a nitrate, hydroxide or sulphate.

In the synthesis of all zeolitic materials of the invention, the source of silicon for the reaction mixture is generally silica, and this is usually most conveniently in the form of a colloidal suspension of silica such as Ludox HS 40 available from E.I. Dupont de Nemours and Co. Colloidal silica sols are preferred since they result in less contaminating phases. However, other forms such as silicates may be used.

The source of aluminium may be an alumina introduced into the reaction medium as, for example, Al$_2$O$_3$.3H$_2$O, previously dissolved in alkali. However, it is also possible to introduce aluminium in the form of the metal, which is dissolved in alkali.

The aluminosilicates of the invention are preferably obtained from reaction mixtures containing potassium. This potassium is preferably introduced as potassium hydroxide.

The produce of the processes described above is a mixed cation form of the zeolite containing alkali metal, preferably potassium, and copper. The molar ratio of K$_2$O/(K$_2$O+CuO) in the product of the invention is preferably greater than 0.95, more preferably greater than 0.98. The amount of copper cation in the zeolite is preferably less than 0.1 wt. % of the zeolite L, and may be below 0.05 wt. % of the zeolite L. By ion exchange of the product in the manner conventional to zeolite chemistry, other cations can be introduced. However, it is a surprising feature of the invention that the copper cation cannot be completely replaced by ion exchange indicating that some of them at least of the copper cations are in non-exchangeable sites in the zeolite L structure.

Within the ranges specified hereinbefore for the composition of the reaction mixture, it is possible to choose ratios of oxides and alkalinity to given particular forms of the aluminosilicate product. The SiO$_2$/Al$_2$O$_3$ ratio in the reaction mixture may vary over a wide range but the SiO$_2$/Al$_2$O$_3$ ratio in the product preferably lies in a relatively narrow range of 5.4 to 7.4. The higher the SiO$_2$/Al$_2$O$_3$ ratio in the reaction mixture, the higher the ratio in the product. Also, decreasing alkalinity (OH$^-$/SiO$_2$) tends to increase the SiO$_2$/Al$_2$O$_3$ ratio in the formed product. Dilution of the reaction mixture with water and thus increasing the H$_2$O/K$_2$O ratio also tends to increase the SiO$_2$/Al$_2$O$_3$ ratio in the product.

Particle size is also affected by the composition of the reaction mixture and the nature of the raw materials used. Generally, the particles formed are in the range of from 0.05 to 4.0 $\mu$, but the use of copper tends to favour small particles, despite the low alkalinity of the synthesis gel.

Crystallisation time is related to the crystallisation temperature. The crystallisation is preferably carried out in the region of 150° C. and at this temperature the crystallisation time may be from 24 to 96 hours, typically from 48 to 72 hours. Lower temperatures may require much longer times to achieve good yield of the desired product, whereas times of less than 24 hours are possible when higher temperatures are used. A time of 8 to 15 hours is typical for a temperature of 200° C. or greater.

The crystallisation is generally carried out in a sealed autoclave and thus at autogenous pressure. It is generally inconvenient, although possible, to employ higher pressures. Lower pressure will require longer crystallisation times.

Following the preparation as described above the zeolite L may be separated, washed and dried in the normal manner.

The formed zeolite L crystallites are in a preferred aspect in the form of cylinders, and most preferably with basal planes of such a shape that the ratio of axial length of curved cylindrical surface (1) to the overall axial length of the crystallite (h) is greater than 0.9, and preferably approaches 1. A geometrically perfect cylinder with completely flat basal planes would have 1=h, and 1/h=1, while any doming or growths on the basal surfaces mean that h is greater than 1, and 1/h is less than 1. We have now found that more perfect cylinders, with flatter basal planes than obtained in EP-A-0096479 result in a zeolite L product with better catalytic performance.

The cylindrical crystallites most preferably have a mean diameter (d) of at least 0.05 $\mu$, more preferably at least 0.1 $\mu$. The aspect ratio (the ratio of the axial length of the cylindrical surface 1 to the mean diameter (d) is preferably at least 0.5, more preferably at least 0.75 and most preferably at least 1.

A particularly preferred zeolite L of the invention comprises crystallites in the form of well-defined, smooth-surfaced cylinders with substantially flat basal planes, and thus a 1/h ratio of substantial unity, a mean diameter (d) of from 0.1 to 0.5 $\mu$, and an aspect ratio of (1/d) from 0.75 to 5.

Preferably the zeolite L comprises cylindrical crystallites wherein at least 80%, more preferably at least 90%, of the basal plans are microscopically flat to within 200Å, and thus do not exhibit spiral step growths thereon.

The terms "cylinder" and "cylindrical" are used herein to describe the shape of a cylinder as defined in solid geometry—that is, a solid bounded by a surface generated by a line moving parallel to a fixed line so as to cut a fixed plane curve and by two parallel planes (bases) which cut the surface. The cylinders will generally be circular cylinders, that is, with circular cross-section, but in the context of the invention the cylinders may also exhibit some flattening of the cylindrical surface such that the cross-section has polygonal, and particularly hexagonal character—that is to say, is in the form of a curvilinear hexagon—and the terms "cylinder" and "cylindrical" are used to include such forms.

The zeolite L of the invention displays an x-ray diffraction pattern typical for zeolite L, subject to the changes in position and intensity of the x-ray lines discussed in EP-A-0096479 and EP-0219354.

The zeolites of the invention are preferably aluminosilicates and are described herein in terms of aluminosilicates, though other elemental substitutions are possible, for example, aluminium may be substituted by gallium, boron, iron and similar trivalent elements, and silicon may be substituted by elements such as germanium or phosphorus. The alumino-silicates preferably have a composition (expressed in terms of molar ratios of the constituent oxides in anhydrous form) of:

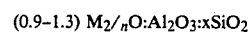

(0.9-1.3) M$_{2/n}$O:Al$_2$O$_3$:xSiO$_2$ wherein M represents one or more cations of valence n, x is from 5 to 7.5, preferably from 6.5 to 7.5. The zeolitic materials of the invention have high crystallinity as shown by a well-defined x-ray diffraction pattern (without binder or other diluents present) with sharp peaks.

The zeolite of the invention may be hydrated, typically with from 0 to 9 moles of water per mole of Al$_2$O$_3$. When used as a catalyst base, as described hereinafter, the zeolite of the invention is preferably first calcined to remove water. In normal preparation from aqueous gels a hydrated form is first prepared and this may be dehydrated by heating.

The zeolite L formed by the invention has excellent properties of extended catalyst life when used as catalyst bases for aromatization catalysts.

The zeolite L prepared by the invention may be used as a catalyst base and may be used in combination with a catalytically active metal in a wide variety of catalytic reactions. It is especially suited to catalytic applications where a low acid site strength is advantageous such as aromatisation.

The catalytically-active metal(s) may be, for example, a Group VIII metal such as platinum, tin, or germanium as described in US-A-4104320, or a combination of platinum and rhenium as described in GB-A-2004764 or BE-A-888365. In the latter case, the catalyst may for appropriate circumstances also incorporate halogen as described in US-A-165276, silver as described in US-A-4295959 and US-A-4206040, cadmium as described in US-A-4295960 and US-A-4231897 or sulphur as described in GB-A-1600927.

We have found a particularly advantageous catalyst composition to incorporate from 0.1 to 6.0 wt. %, preferably from 0.1 to 1.5 wt. % platinum or palladium, since this gives excellent results in aromatisation. From 0.4 to 1.2 wt. % platinum is particularly preferred, especially in conjunction with the potassium form of the alumino-silicate. The invention extends to catalysts comprising the zeolite and a catalytically-active metal.

It may also be useful to incorporate into the catalyst of the invention one or more materials substantially inert under the conditions in which the catalyst is to be employed to act as a binder. Such binders may also act to improve the resistance of the catalyst to temperature, pressure and attrition.

The zeolite L of the invention may be used in a process for the conversion of a hydrocarbon feed in which the feed is contacted with a catalyst as described above under appropriate conditions to bring about the desired conversion. They may, for example, be useful in reactions involving aromatisation and/or dehydrocyclisation and/or isomerisation and/or dehydrogenation reaction. They are particularly useful in a process for the dehydrocyclisation and/or isomerisation of aliphatic hydrocarbons in which the hydrocarbons are contacted at a temperature of from 370 to 600° C., preferably 0 to 550C, with a catalyst comprising zeolite L of the invention, preferably having at least 90% of the exchangeable cations M as alkali metal ions, and incorporating at least one Group VIII metal having dehydrogenating activity, so as to convert at least part of the aliphatic hydrocarbons into aromatic hydrocarbons.

The aliphatic hydrocarbons may be straight or branched chain acyclic hydrocarbons and particularly paraffins such as hexane, although mixtures of hydrocarbons may also be used such as paraffin fractions containing a range of alkanes possibly with minor amounts of other hydrocarbons. Cycloaliphatic hydrocarbon such as methylcyclopentane may also be used. In a preferred aspect the feed to a process for preparing aromatic hydrocarbons and particularly benzene comprises hexanes. The temperature of the catalytic reaction may be from 370 to 600° C., preferably 430 to 550° C. and preferably pressures in excess of atmospheric are used, for example up to 2000 KPa, more preferably 500 to 1000 KPa. Hydrogen is employed in the formation of aromatic hydrocarbons preferably with a hydrogen to feed ratio of less than 10.

The process is preferably otherwise carried out in the manner described in US-A-4104320, BE-A-888365, EP-A-0040119, EP-A-0142351, EP-A-0145289 or EP-A-0142352.

The invention will now be described in more detail, though only by way of illustration, in the following examples and evaluations.

COMPARATIVE EXAMPLE 1 preparation of Zeolite L

Zeolite L was prepared according to the procedure of EP 0096479. A synthesis gel was prepared having the following composition expressed in moles of pure oxide:

$$2.60K_2O:Al_2O_3:10SiO_2:160H_2O$$

This gel was prepared as follows:

The aluminium hydroxide was dissolved by boiling in an aqueous solution of potassium hydroxide pellets (86% pure KOH) to form Solution A. After dissolution any water loss was corrected. A separate solution, Solution B, was prepared by diluting colloidal silica (Ludox HS 40) with water.

Solutions A and B were mixed for two minutes to form a gel, and just before the gel became fully stiff, it was transferred to a Teflon-lined autoclave, preheated to 150° C. and held at that temperature for 72 hours to bring about crystallisation.

The formed zeolite L was highly crystalline with a typical zeolite L x-ray diffraction (XRD) pattern. Scanning electron micrographs (SEM) show the product to be formed solely of cylindrical crystals having a mean diameter of 1 to 2 microns, an aspect ratio (1/d) of 0.5–1 and 1/h ratio of 0.65–0.85. The $SiO_s:Al_2O_3$ ratio in the product was 6.3.

COMPARATIVE EXAMPLE 2-6

Variation of potassium content

As shown in Table 1, the variation of the amount of potassium in the case where M=K was also investigated. Variation of potassium content from 2.41 moles $K_2O$ (Example 3) to 2.75 moles $K_2O$ (Example 2) gave zeolite L with a cylindrical form, but with 1/h 1. Example 4 gave zeolite L with a morphology intermediate a clam shape and the cylinder shape—that is, 1/h was very much less than 1.

A low potassium content of 2.15 moles $K_2O$ (Example 5) gave a product with low crystallinity. A high potassium content of 3.4 moles $K_2O$ (Example 6) gave a clam-shaped product.

EXAMPLE 1

Preparation of Zeolite L according the invention

The procedure of Example 1 was modified by the addition of copper to the synthesis gel. Solution A was prepared from:

| KOH (87.3% KOH) pellets | 30.15 g |
| Aluminium hydroxide (98.6%) | 15.1 g |
| Water | 77.10 g |

The aluminium hydroxide powder was dissolved in the potassium hydroxide solution by boiling. After cooling to ambient temperature, the water loss was corrected.

Solution B was prepared from:

| Copper nitrate Cu(NO$_3$)$_2$.3H$_2$O | 0.6048 g |
| Silica (Ludox HS 40) | 150.25 g |
| Water | 114.63 g |

Coper nitrate crystals were dissolved in a portion of the water and added to the colloidal silica solution, and mixed for 3 minutes.

Solution A was added to Solution B and mixed for 3 minutes to homogenize the synthesis gel. This had the composition (in moles of oxides):

2.35K$_2$O:0.025CuO:Al$_2$O$_3$:10SiO$_2$:162H$_2$O

Crystallisation was conducted at 175° C. for 65 hours in a 300 ml stainless steel autoclave. The product was washed demineralised with water. The pH of the water from the last washing was 10.5. The product was dried at 125° C. for 24 hours.

The formed zeolite L had a faint blue hue suggesting at least some of the copper was present as a segregated crystalline phase. The product was a highly crystalline zeolite L displaying the characteristic x-ray difraction pattern of zeolite L with no contamination by zeolite W. The crystallites were cylindrical with some hexagonal tendency in cross-section—average length 0.6 microns, average diameter 0.4 microns.

TABLE 1

| Comparative Sample | Gel Composition (moles) | | | | Product (wt %) | | | | |
|---|---|---|---|---|---|---|---|---|---|
| | K$_2$O | Al$_2$O$_3$ | SiO$_2$ | H$_2$O | K$_2$O | Al$_2$O$_3$ | SiO$_2$ | H$_2$O | |
| 2 | 2.75 | 1 | 10 | 160 | 6.7 | 2.7 | 15.6 | 75.0 | cylindrical zeolite L (l/h <1) |
| 3 | 2.41 | 1 | 10 | 160 | 5.9 | 2.7 | 15.8 | 75.6 | cylindrical zeolite L (l/h <1) |
| 4 | 3.01 | 1 | 10 | 160 | 7.3 | 2.6 | 15.5 | 74.5 | clam/cylinder zeolite L (l/h <<1) |
| 5 | 2.15 | 1 | 10 | 160 | 5.3 | 2.7 | 15.9 | 76.1 | low crystallinity product |
| 6 | 3.4 | 1 | 10 | 160 | 8.2 | 2.6 | 15.4 | 73.8 | clam-shaped zeolite L |

I claim:

1. A process for the preparation of zeolite L, in which an alkaline reaction mixture comprising water, a source of alkali metal, a source of silicon and a source of aluminium is heated to a temperature of from at least 75° C. to form the zeolite L, characterized in that the reaction mixture comprises a source of copper and has a composition falling within the following molar ratios (expressed as oxides):

| (M$^1_2$O + CuO)SiO$_2$ | 0.18–0.36 |
| H$_2$O/(M$^1_2$O + CuO) | 25–90 |
| SiO$_2$/Al$_2$O$_3$ | 5–15 |
| M$^1_2$O/(M$^1_2$O + CuO) | 0.900–0.9999 |

(wherein M$^1$ is an alkali metal).

2. A process as claimed in claim 1, in which the reaction mixture is heated to from 10020 C. to 250° C.

3. A process as claimed in claim 2, in which the reaction mixture is heated to from 120° C. to 225° C.

4. A process for the preparation of zeoliteL, in which a reaction mixture comprising water, a source of potassium, a course of silicon, a source of aluminium is heated to a temperature of at least 75° C. to form the desired zeolite L, characterised in that the reaction mixture contains copper and that the reaction mixture is such that in the absence of copper the formed product would comprise substantial amounts by zeolite W, the amount of copper being such that its presence results in reduced contamination by zeolite W.

5. A process as claimed in claim 1, in which the reaction mixture comprises:

| (M$^1_2$O + CuO)/SiO$_2$ | 0.18–0.26 |
| H$_2$O/(M$^1_2$O + CuO) | 50–90 |
| SiO$_2$/Al$_2$O$_3$ | 6–12 |
| M$^1_2$/(M$^1_2$O + CuO) | 0.950–0.9999 | where M$^1$ is potassium or a mixture of potassium and a second alkali metal M$^2$ when the molar ration K$_2$O/K$_2$O is from 0.5 to 1.

6. A method of suppressing zeolite W formation in the preparation of zeolite L from a crystallization gel in which the crystallization conditions would otherwise allow zeolite W formation, which method comprises introducing into the gel a zeolite W-suppressing amount of a source of copper 7. A method of reducing the crystallite size of zeolite L prepared from a synthesis gel for forming zeolite L, in which there is introduce into the synthesis gel from 0.1 ppm to 0.1 wt. % of copper based on the weight of the gel.

8. A method as claimed in claim 7 in which the amount of copper is from 5 ppm to 0.05 wt. % based on the weight of the gel.

9. A stirred synthesis for zeolite L, in which a zeolite W-suppressing amount of copper is introduced into a reaction mixture capable of forming zeolite L in a static synthesis and the reaction mixture containing copper is heated to a temperature of at least 75° C. with stirring to form zeolite L.

10. Zeolite L containing copper in non-exchangeable sites in the zeolite L structure.

11. A catalyst comprising zeolite L as claimed in claim 10 and a catalytically active metal.

* * * * *